United States Patent
Yamauchi

(10) Patent No.: US 7,751,689 B2
(45) Date of Patent: Jul. 6, 2010

(54) STREAM CONVERTER

(75) Inventor: Kenichiro Yamauchi, Kyoto (JP)

(73) Assignee: Panasonic Corporation, Osaka (JP)

( * ) Notice: Subject to any disclaimer, the term of this patent is extended or adjusted under 35 U.S.C. 154(b) by 994 days.

(21) Appl. No.: 10/589,618

(22) PCT Filed: Feb. 9, 2005

(86) PCT No.: PCT/JP2005/001916

§ 371 (c)(1),
(2), (4) Date: Aug. 16, 2006

(87) PCT Pub. No.: WO2005/081246

PCT Pub. Date: Sep. 1, 2005

(65) Prior Publication Data

US 2007/0177850 A1 Aug. 2, 2007

(30) Foreign Application Priority Data

Feb. 20, 2004 (JP) .............................. 2004-045268

(51) Int. Cl.
H04N 5/91 (2006.01)
(52) U.S. Cl. ..................... 386/96; 386/111; 386/125; 386/126
(58) Field of Classification Search .............. 386/46, 386/95, 96, 98, 125, 126
See application file for complete search history.

(56) References Cited

U.S. PATENT DOCUMENTS

| | | | | |
|---|---|---|---|---|
| 6,314,518 | B1 * | 11/2001 | Linnartz | 713/176 |
| 7,149,414 | B2 * | 12/2006 | Yagi et al. | 386/105 |
| 2003/0152372 | A1 | 8/2003 | Shimizu et al. | |
| 2004/0240856 | A1 * | 12/2004 | Yahata et al. | 386/98 |

FOREIGN PATENT DOCUMENTS

| | | |
|---|---|---|
| JP | 2003-101927 A | 4/2003 |
| JP | 2003-111023 A | 4/2003 |
| JP | 2003-116098 A | 4/2003 |
| JP | 2003-132628 A | 5/2003 |
| JP | 2004-289380 A | 10/2004 |

* cited by examiner

*Primary Examiner*—Huy T Nguyen
(74) *Attorney, Agent, or Firm*—McDermott Will & Emery LLP

(57) ABSTRACT

Conversion of audio data is performed such that a bit stream conforming to the DVD-VR standard is converted into a bit stream conforming to the DVD-video standard.

A stream converter includes: a first converter for receiving a bit stream conforming to a DVD-VR standard, converting data except for audio data in the bit stream into data conforming to a DVD-video standard, and outputting a resultant bit stream; and a second converter for converting, when the audio data in the bit stream output from the first converter does not conform to the DVD-video standard, the audio data into data conforming to the DVD-video standard, and outputting a resultant bit stream.

9 Claims, 16 Drawing Sheets

STREAM CONVERTER

RELATED APPLICATIONS

This application is the U.S. National Phase under 35 U.S.C. §371 of International Application No. PCT/JP2005/001916, filed on Feb. 9, 2005, which in turn claims the benefit of Japanese Application No. 2004-045268, filed on Feb. 20, 2004, the disclosures of which Applications are incorporated by reference herein.

TECHNICAL FIELD

The present invention relates to techniques for converting bit streams conforming to the DVD video recording standard (DVD Specifications for Rewritable/Re-recording Discs, Part 3) into a bit stream conforming to the DVD video standard (DVD Specifications for Read-Only Disc, Part 3).

BACKGROUND ART

Recording on DVDs (digital versatile discs) is performed according the DVD video recording (DVD-VR) standard or the DVD-video standard. The DVD-VR standard is used for real-time recording of contents. On the other hand, contents recorded according to the DVD-video standard can be played back by DVD players which are exclusively used for playback.

In digital recording equipment such as DVD recorders, recording is generally performed according to the DVD-VR standard because editing is easy. However, to perform playback by other equipment such as a DVD player, it is necessary to convert the format of a content recorded according to the DVD-VR standard into another format conforming to the DVD-video standard.

To convert the format of a recorded content from the DVD-VR standard into the DVD-video standard, a method in which a digital signal is decoded, coded again and then recorded can be used. In this method, however, coding is performed again after decoding. Accordingly, this method has not only a problem in which the time necessary for the conversion is equal to the actual length of the content but also a problem in which the image quality of the content deteriorates.

In view of this, a technique of converting a digital-recorded content into another format while leaving the content digital without decoding is proposed. For example, a system and a method for converting a bit stream in an RTR (Real Time Recording) format into a bit stream in a DVD-video standard format are disclosed in Patent Document 1. Hereinafter, a conversion in which a bit stream conforming to the DVD-VR standard as data in the RTR format is directly converted into a bit stream conforming to the DVD-video standard while leaving the bit stream digital without decoding will be referred to as a "digital conversion".

Patent Document 1: Japanese Unexamined Patent Publication No. 2003-101927

DISCLOSURE OF INVENTION

Problems that the Invention Is to Solve

Now, application in which a bilingual broadcast is recorded on a hard disk and is copied on a DVD-R disk will be described. In general, a bit stream conforming to the DVD-VR standard or the DVD-video standard is allowed to be recorded on a hard disk, whereas a bit stream conforming to the DVD-video standard is recorded on a DVD-R disk. Accordingly, to copy a bit stream from the hard disk to the DVD-R disk, a digital conversion of a bit stream conforming to the DVD-VR standard into a bit stream conforming to the DVD-video standard is necessary in some cases.

In the DVD-VR standard, a mode (dual mono mode) in which two types of monophonic audio are simultaneously recorded is permitted as a mode for audio recording, but is not permitted in the DVD-video standard. Therefore, to record a bit stream of a bilingual broadcast on a hard disk while maintaining two types of audio included in the broadcast, the bit stream is recorded on the hard disk as a bit stream in the dual mono mode conforming to the DVD-VR standard.

However, when the bit stream of the bilingual broadcast is subjected to a digital conversion and is copied from the hard disk to a DVD-R disk, failures can occur during playback of the DVD-R disk. Specifically, when the DVD-R disk is replayed by a DVD player or other equipment, an audio stream in the dual mono mode is interpreted as stereo audio, so that audio in different languages can be simultaneously output from speakers at both sides for stereo playback.

To avoid such failures, according to conventional techniques, when a bilingual broadcast is recoded on a hard disk as a bit stream in the dual mono mode, no digital conversion is performed on the bit stream. In this case, however, there arises a problem in which one of the two types of audio cannot be recorded during recording of the bilingual broadcast for a digital conversion.

In addition, to perform a digital conversion of a bit stream including compressed audio data, the audio data needs to be previously compressed by a method in compliance with the DVD-video standard for recording of the bit stream according to the DVD-VR standard.

It is therefore an object of the present invention to provide a stream converter for converting audio data such that a bit stream conforming to the DVD-VR standard is converted into a bit stream conforming to the DVD-video standard.

Means of Solving the Problem

A stream converter according to the present invention includes: a first converter for receiving a bit stream conforming to a DVD-VR standard, converting data except for audio data in the bit stream into data conforming to a DVD-video standard, and outputting a resultant bit stream; and a second converter for converting, when the audio data does not conform to the DVD-video standard, the audio data in the bit stream output from the first converter into data conforming to the DVD-video standard, and outputting a resultant bit stream.

This stream converter is capable of converting audio data not conforming to the DVD-video standard into audio data conforming to the DVD-video standard. Accordingly, a bit stream conforming to the DVD-VR standard and including audio data not conforming to the DVD-video standard is allowed to be directly converted into a bit stream conforming to the DVD-video standard without decoding.

In the stream converter, the second converter preferably includes: a channel buffer for storing data of one channel in an input audio pack and outputting the data; and a channel copying unit for generating and outputting an audio pack in which data of another channel in the audio pack is replaced with the data output from the channel buffer.

The second converter preferably further includes a flag rewriting unit for receiving an audio pack, supplying a flag indicating stereo as a flag indicating the number of channels in the audio pack, and outputting a resultant audio pack.

In the stream converter, the second converter preferably includes: a channel removing unit for removing data of one channel in an input audio pack and outputting a resultant audio pack; and a padding generator for adding, to the audio pack output from the channel removing unit, a padding packet having a length equal to the length of the removed data, and outputting a resultant audio pack.

The second converter preferably further includes a flag rewriting unit for receiving an audio pack, supplying a flag indicating monaural as a flag indicating the number of channels in the audio pack, and outputting a resultant audio pack.

When the audio pack output from the channel removing unit includes a stuffing byte, the padding generator preferably removes the stuffing byte and increases the length of the padding packet by the length of the stuffing byte.

The second converter preferably further includes: a channel buffer for storing data of a channel to be removed by the channel removing unit in an input audio pack and outputting the data; and a complementary pack generator for generating and outputting an audio pack including the data output from the channel buffer and a stream ID different from that in an audio pack input to the second converter.

In the stream converter, when the audio data is compressed audio data, the second converter preferably decodes the audio data, converts the decoded audio data into a format conforming to the DVD-video standard, encodes the converted audio data, and then outputs resultant data.

In the stream converter, when the audio data is compressed in a format not conforming to the DVD-video standard, the second converter preferably decodes the audio data, encodes the decoded audio data in a format conforming to the DVD-video standard, and outputs resultant data.

In the stream converter, when the audio data is in a dual mono mode, or when the audio data has been coded by an MPEG audio algorithm, it is preferably determined that the audio data is not in the format conforming to the DVD-video standard.

Effect of the Invention

As described above, according to the present invention, a bit stream conforming to the DVD-VR standard and including audio data not conforming to the DVD-video standard is allowed to be directly converted into a bit stream conforming to the DVD-video standard without decoding. Accordingly, deterioration of, for example, image quality is prevented and the time necessary for conversion is reduced.

Figure 1:
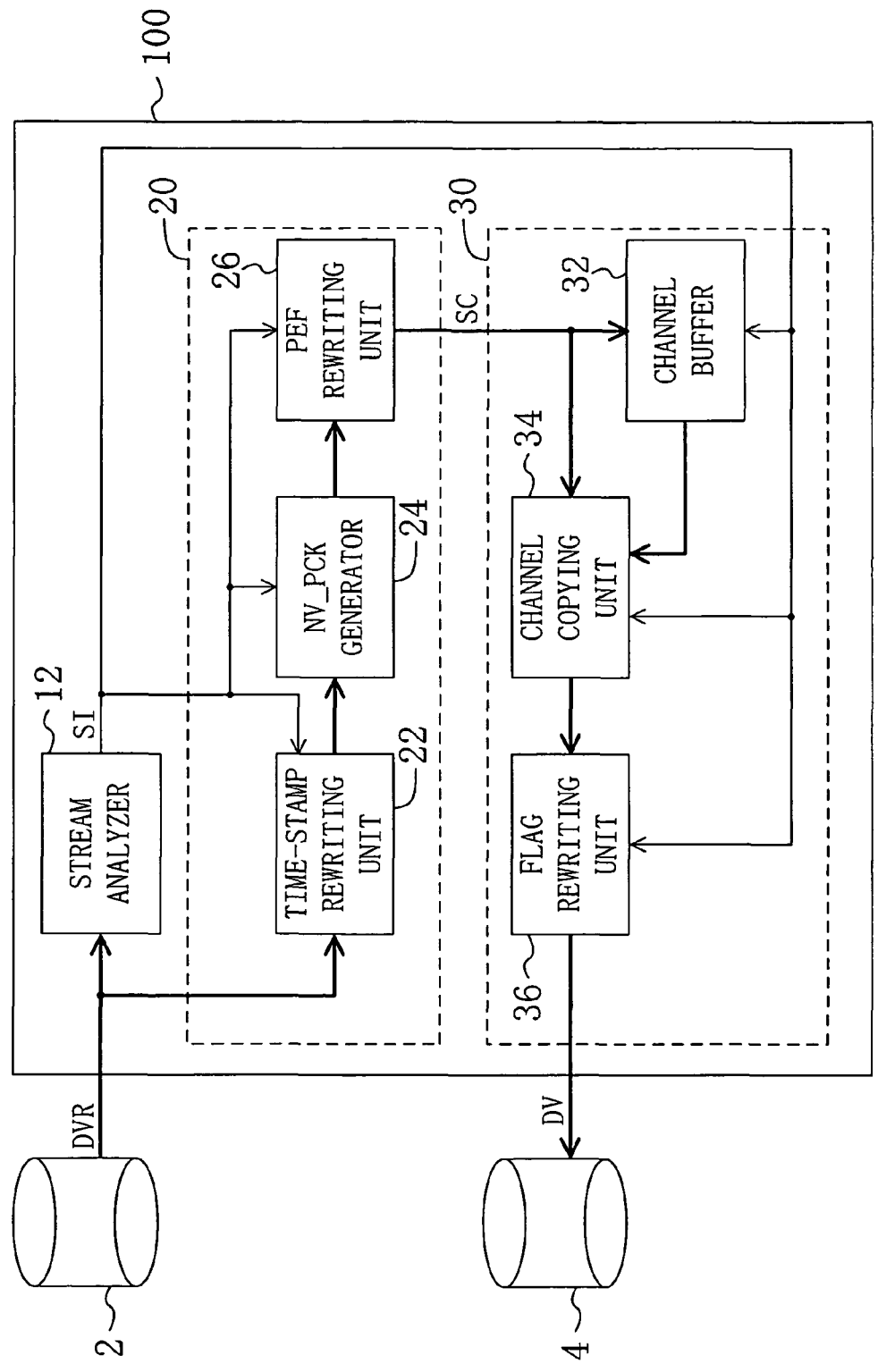
FIG. 1 is a block diagram illustrating a stream converter according to a first embodiment of the present invention.

BRIEF EXPLANATION OF REFERENCE NUMERALS 12 stream analyzer
20 first converter
30, 230, 330, 430 second converter
32 channel buffer
34 channel copying unit
36, 236 flag rewriting unit
232 channel removing unit
234 padding generator
342 channel buffer
344 complementary pack generator
100, 200, 300, 400 stream converter

BEST MODE FOR CARRYING OUT THE INVENTION

Hereinafter, embodiments of the present invention will be described with reference to the drawings.

Embodiment 1

FIG. 1 is a block diagram illustrating a stream converter according to a first embodiment of the present invention. A stream converter 100 illustrated in FIG. 1 includes: a stream analyzer 12; a first converter 20; and a second converter 30. The first converter 20 includes: a time-stamp rewriting unit 22; a navigation pack generator (NV_PCK generator) 24; and a PES_extension_field rewriting unit (PEF rewriting unit) 26. The second converter 30 includes: a channel buffer 32; a channel copying unit 34; and a flag rewriting unit 36.

A bit stream DVR read out from a storage device 2 is supplied to the stream analyzer 12 and the time-stamp rewriting unit 22. The bit stream DVR conforms to the DVD video recording (DVD-VR) standard (DVD Specifications for Rewritable/Re-recording Discs, Part 3). A bit stream DV output from the flag rewriting unit 36 is written in a storage device 4. The bit stream DV conforms to the DVD-video standard (DVD Specifications for Read-Only Disc, Part 3).

In the following embodiments, it is assumed that the storage device 2 is a hard disk drive and the storage device 4 is a DVD-R drive, as an example. The storage device 2 only needs to be a device which outputs a bit stream conforming to the DVD-VR standard, and may be a DVD-RW drive or a DVD-RAM drive, for example. The storage device 4 only needs to be a device in which a bit stream conforming to the DVD-video standard can be recorded, and may be a hard disk drive or a DVD-RW drive, for example. The storage device 2 and the storage device 4 may be the same device. That is, a converted bit stream conforming to the DVD-video standard may be recorded on a device from which a bit stream conforming to the DVD-VR standard before conversion is output.

Figure 2:
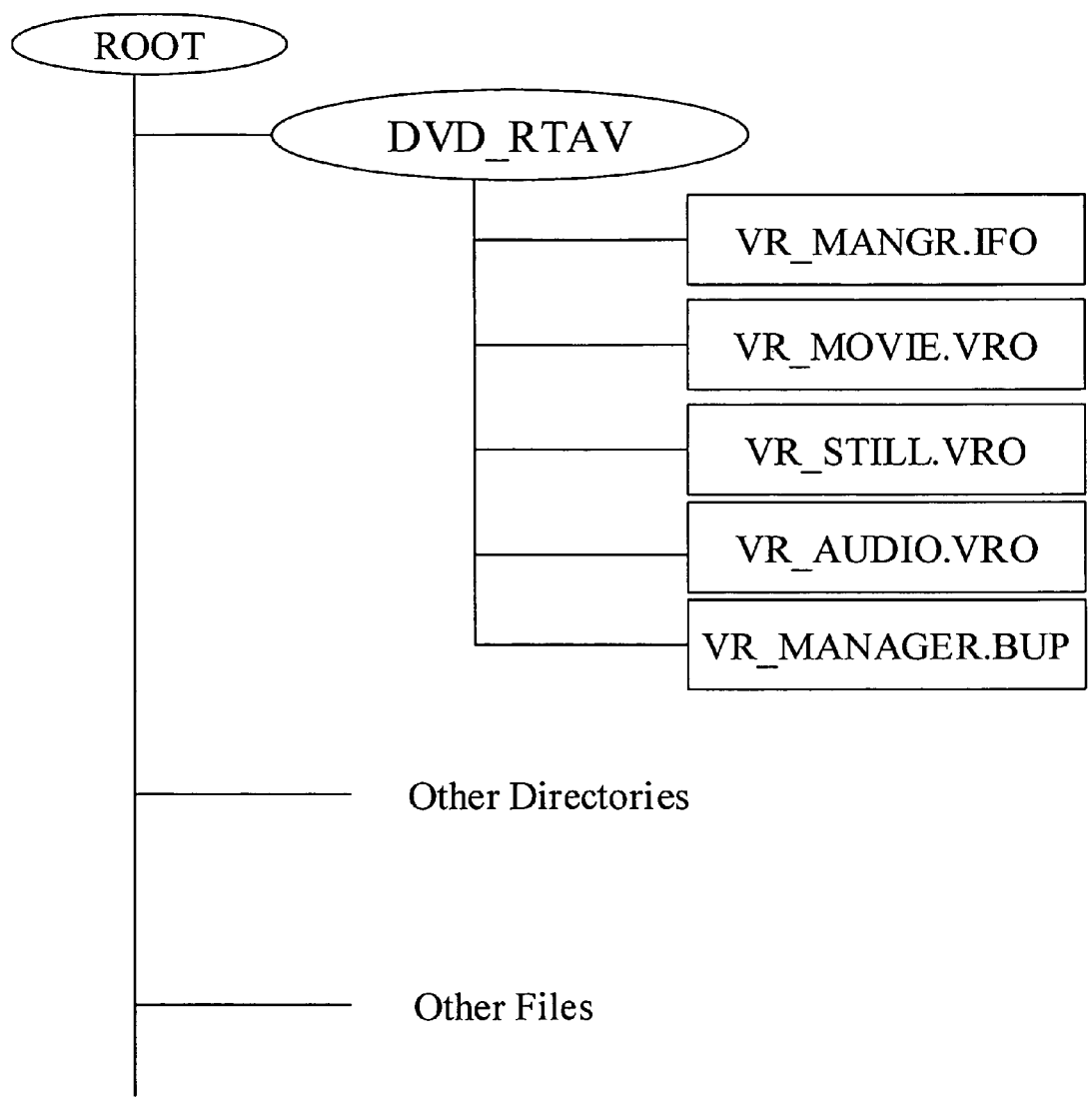
FIG. 2 is an explanatory diagram illustrating a directory structure of a disk on which information is recorded according to the DVD-VR standard.

Now, the DVD-VR standard and the DVD-video standard will be described. FIG. 2 is an explanatory diagram illustrating a directory structure of a disk on which information is recorded according to the DVD-VR standard. As illustrated in FIG. 2, directories of this disk have a hierarchy. A DVD_RTAV is provided under a ROOT directory. This directory includes files: VR_MANGR.IFO, VR_MOVIE.VRO, VR_STILL.VRO, VR_AUDIO.VRO and VR_MANAGER. BUP.

The VR_MANGR.IFO is a file for video management information. Specifically, the VR_MANGR.IFO includes a start address, a time zone, a character code, basic information on a recorded disk, video/audio attributes, information on a still-picture file, playback start/end times, search information on video/audio attributes, an entry point, information on a program chain such as text information, text information on a program and a play list, and other information.

Video data, audio data and subpicture data to be played back from a DVD are stored in the VR_MOVIE.VRO. Each of the video data and the audio data is constituted by a plurality of files in units of VOBs. A still picture is stored in the VR_STILL.VRO. Audio data for displaying a still-picture is stored in the VR_AUDIO.VRO. The VR_MANAGER.BUP is a backup of the VR_MANGR.IFO.

Figure 3:
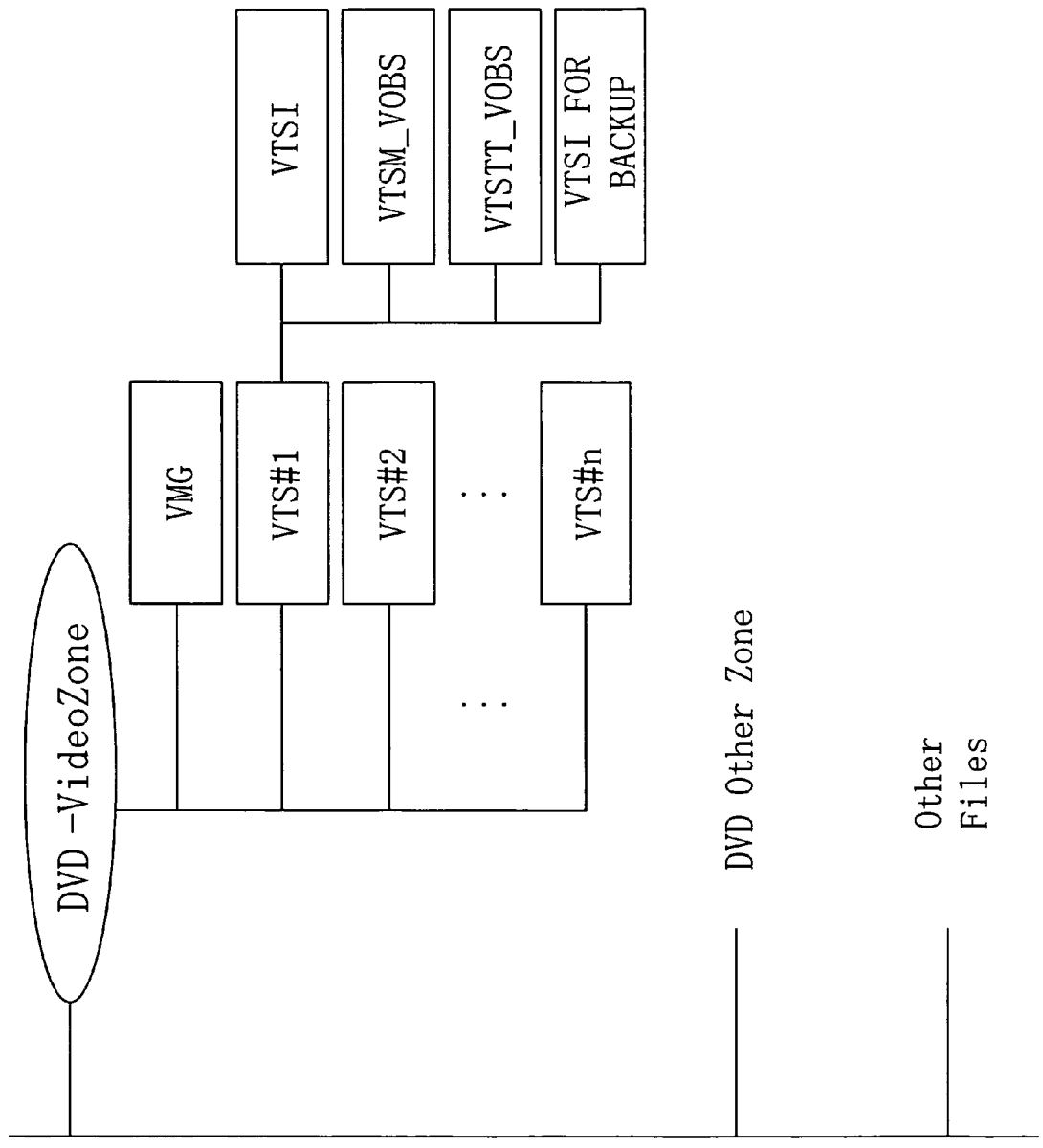
FIG. 3 is an explanatory diagram illustrating a directory structure of a disk on which information is recorded according to the DVD-video standard.

FIG. 3 is an explanatory diagram illustrating a directory structure of a disk on which information is recorded according to the DVD-video standard. A disk conforming to the DVD-video standard has a single DVD Video Zone. The DVD Video Zone is constituted by a VMG and a plurality of VTSs. Each of the VTSs is constituted by a VTSI, a VTSM_VOBS, a VTSTT_VOBS and a VTSI for backup.

The VTSI includes information on playback control of data included in one of the VTSs. In the VTSM_VOBS, information used for a menu of a DVD is stored. Video data, audio data and subpicture data are stored in the VTSTT_VOBS. Each of the video data and audio data is constituted by a plurality of files in units of VOBs.

In a digital conversion, most of the circuit resources and software resources are used to convert VOBs of moving images and audio included in the VR_MOVIE.VRO conforming to the DVD-VR standard into VOBs conforming to the DVD video standard.

Figure 4:
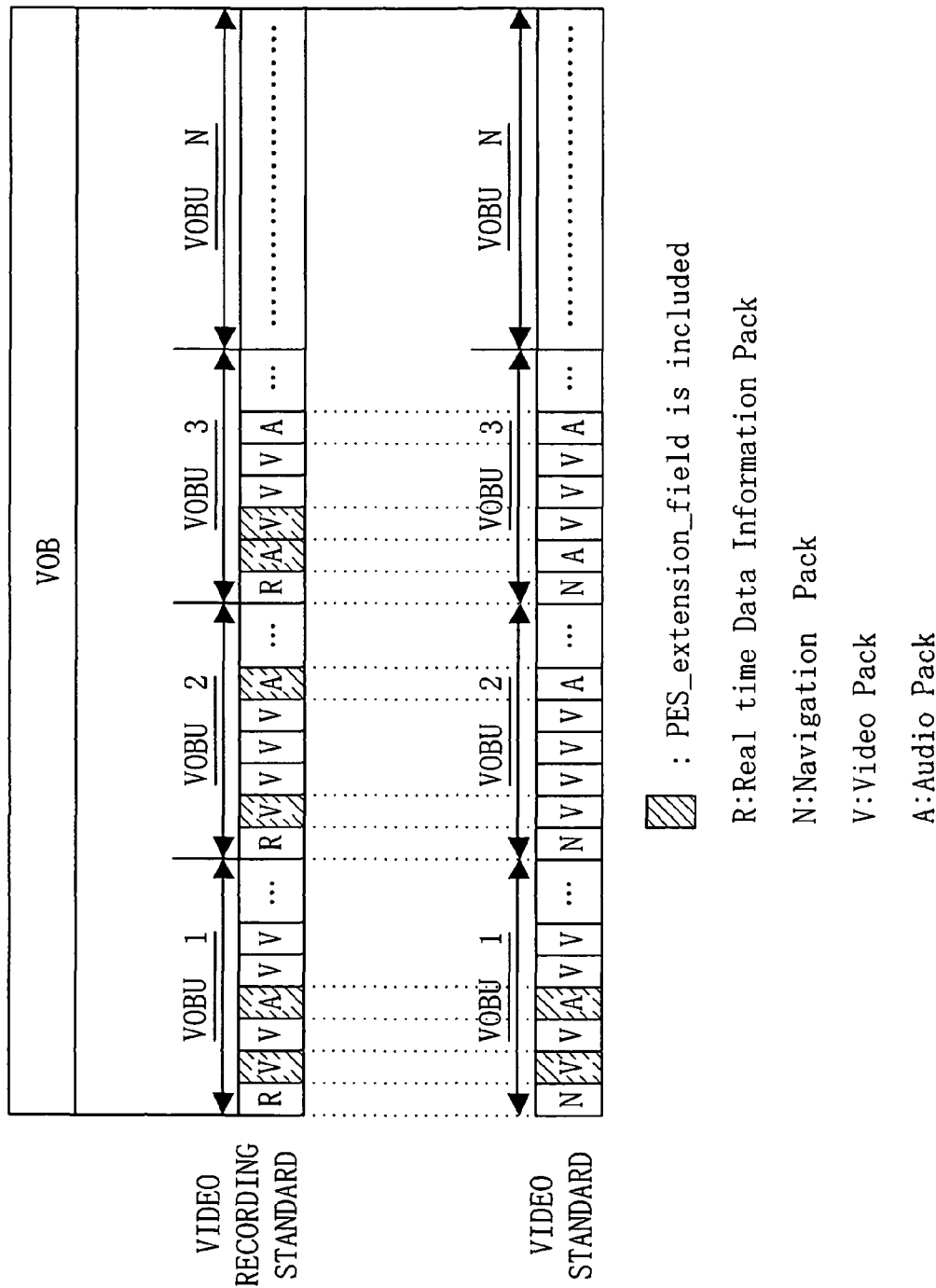
FIG. 4 illustrates structures of VOBs conforming to the DVD-VR standard and the DVD-video standard, respectively.

FIG. 4 illustrates structures of VOBs conforming to the DVD-VR standard and the DVD-video standard, respectively. Each of the VOBs is constituted by a plurality of VOBUs. In this aspect, the VOBs are common to both of the standards. Each of the VOBUs is constituted by a plurality of packs. Each pack is data of 2048 bytes.

In the DVD-VR standard, each pack is one of a real time data information pack (RDI_PCK), a video pack (V_PCK) and an audio pack (A_PCK). In the DVD-video standard, each pack is one of a navigation pack (NV_PCK), a video pack and an audio pack. In FIG. 4, the hatched sections indicate packs including PES_extension_fields.

In this embodiment, the number of VOBUs in a VOB and the length of the VOB are the same between both of the DVD-VR standard and the DVD-video standard. However, none of the number and the length is specifically defined in the standards. In FIG. 4, the RDI_PCK is placed at the head of each VOBU. However, the head pack of each VOBU is not necessarily the RDI_PCK.

Figure 5:
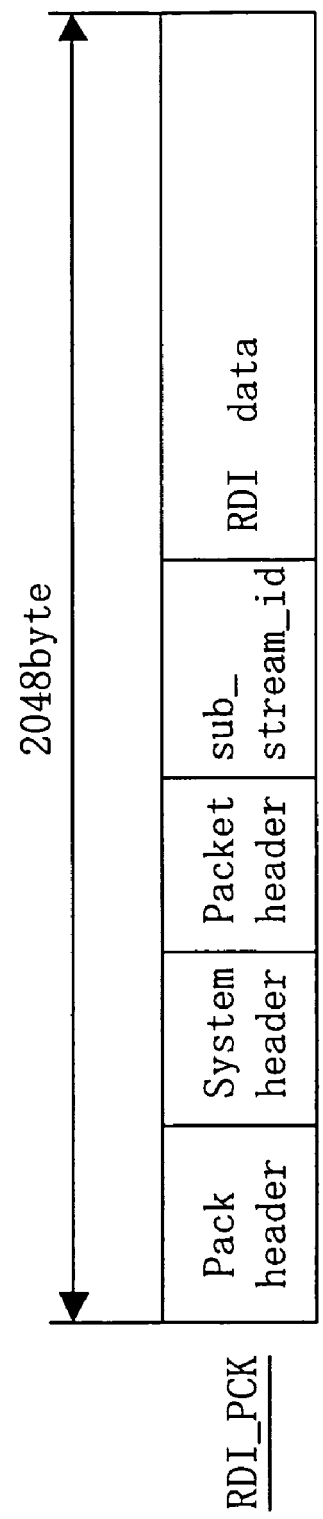
FIG. 5 illustrates a structure of a real time data information pack (RDI_PCK).

FIG. 5 illustrates a structure of a real time data information pack (RDI_PCK). The RDI_PCK is a pack for storing real time information. User data is stored in a portion indicated by an RDI data. A Pack header contains a pack header code and time information of the pack (SCR: system clock reference), for example. A System header includes a bit rate and buffer information, for example. A Packet header is a PES header of each pack. The type of a pack is determined by a stream ID (stream_id) in this Packet header and a substream ID (sub_stream_id).

Figure 6:
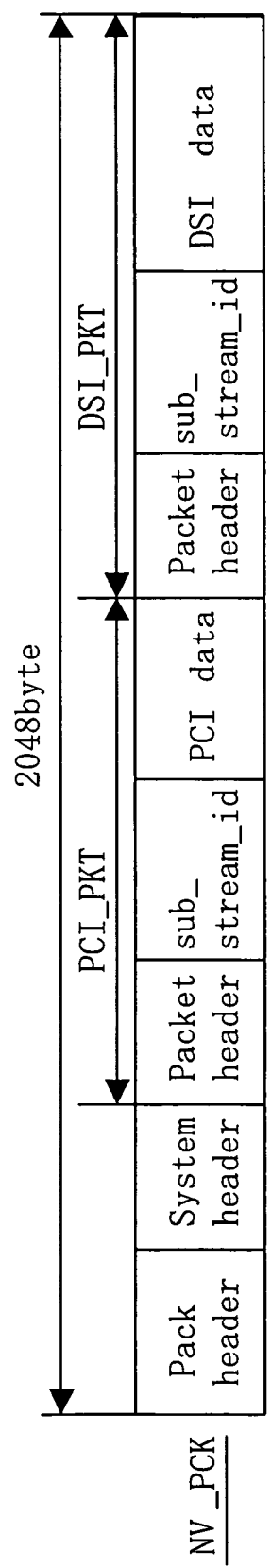
FIG. 6 illustrates a structure of a navigation pack (NV_PCK).

FIG. 6 illustrates a structure of a navigation pack (NV_PCK). The NV_PCK is a pack in which positional information on data to be played back and copyright information, for example, are stored. A Pack header, a System header, a Packet header and a sub_steam_id are the same as those in the RDI_PCK.

Figure 7:
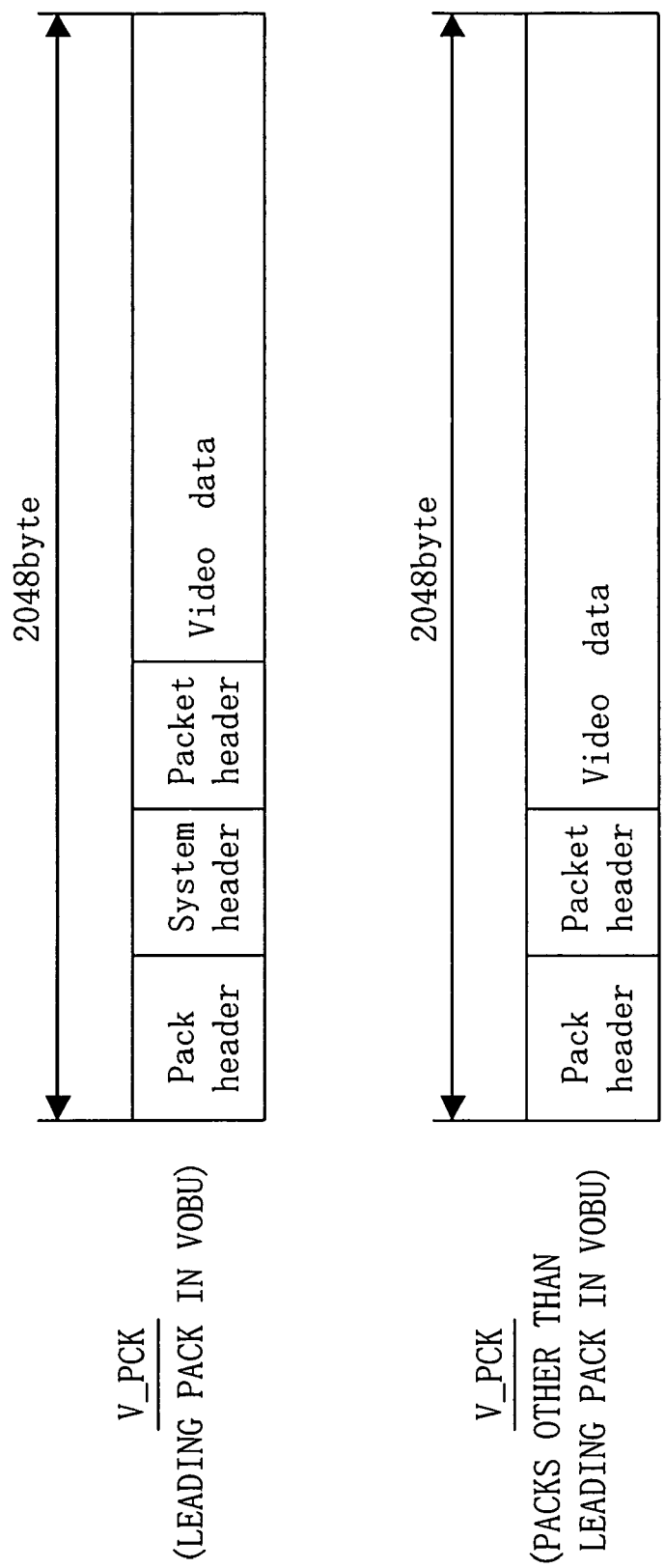
FIG. 7 illustrates structures of video packs (V_PCKs).

FIG. 7 illustrates structures of video packs (V_PCKs). The video packs are packs in which image information is stored. Image data is stored in a portion indicated by a Video data in FIG. 7. A Pack header, a System header and a Packet header are the same as those in the RDI_PCK. If a video pack is a leading pack of a VOBU, this video pack includes a System header. Otherwise, the video pack includes no System header.

Figure 8:
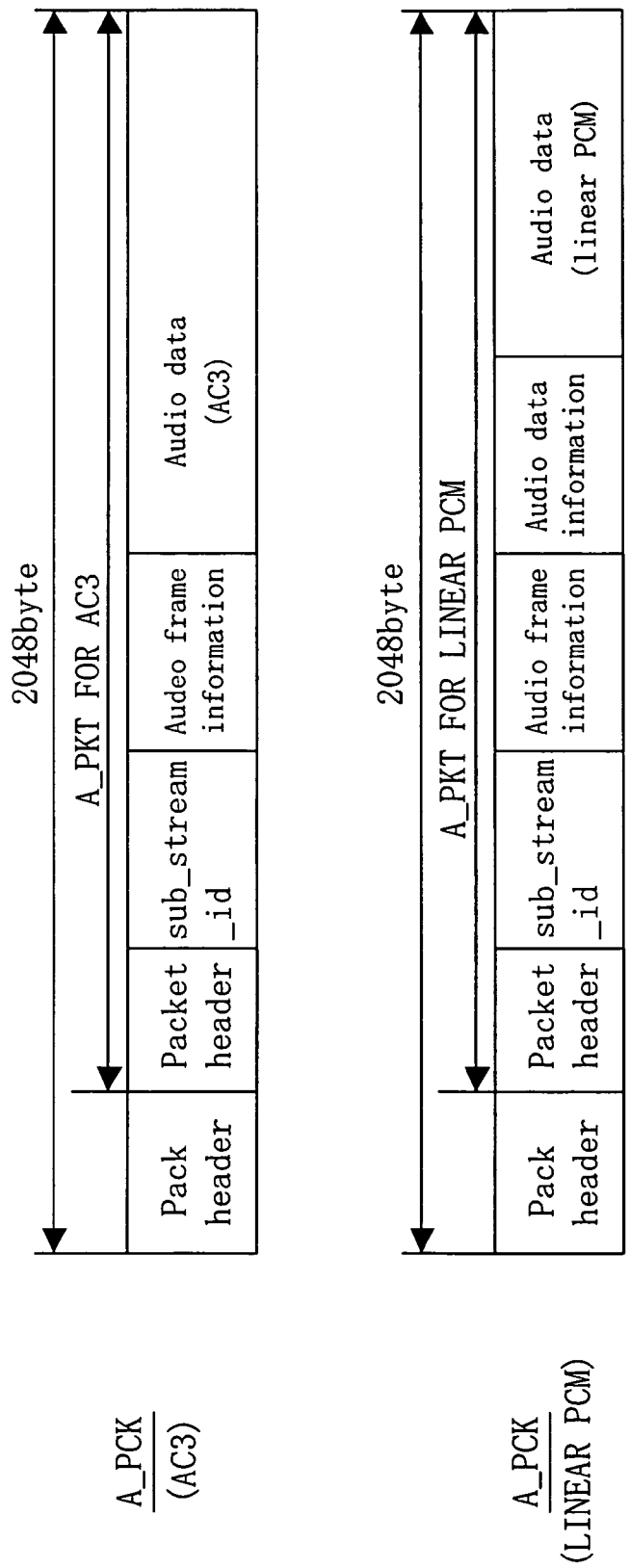
FIG. 8 illustrates structures of audio packs (A_PCKs).

FIG. 8 illustrates structures of audio packs (A_PCKs). The audio packs are packs in which audio data is stored. FIG. 8 show a case in which an audio pack contains audio data in the AC3 format and a case in which an audio pack contains audio data in the linear pulse code modulation (LPCM) format. A Pack header, a System header, a Packet header and a sub_steam_id are the same as those in the RDI_PCK. Audio frame information indicates a frame number, for example, of audio data included in a pack.

In addition, in the case of the LPCM format, the audio pack includes audio data information. This information includes data indicating the number of quantization bits (quantization_word_length), a sampling frequency (audio_sampling_frequency), the number of channels (number_of audio_channels) and range control (dynamic_range_control). Three types of data (flags) indicating the number of channels, i.e., mono, stereo and dual mono, are provided.

Figure 9:
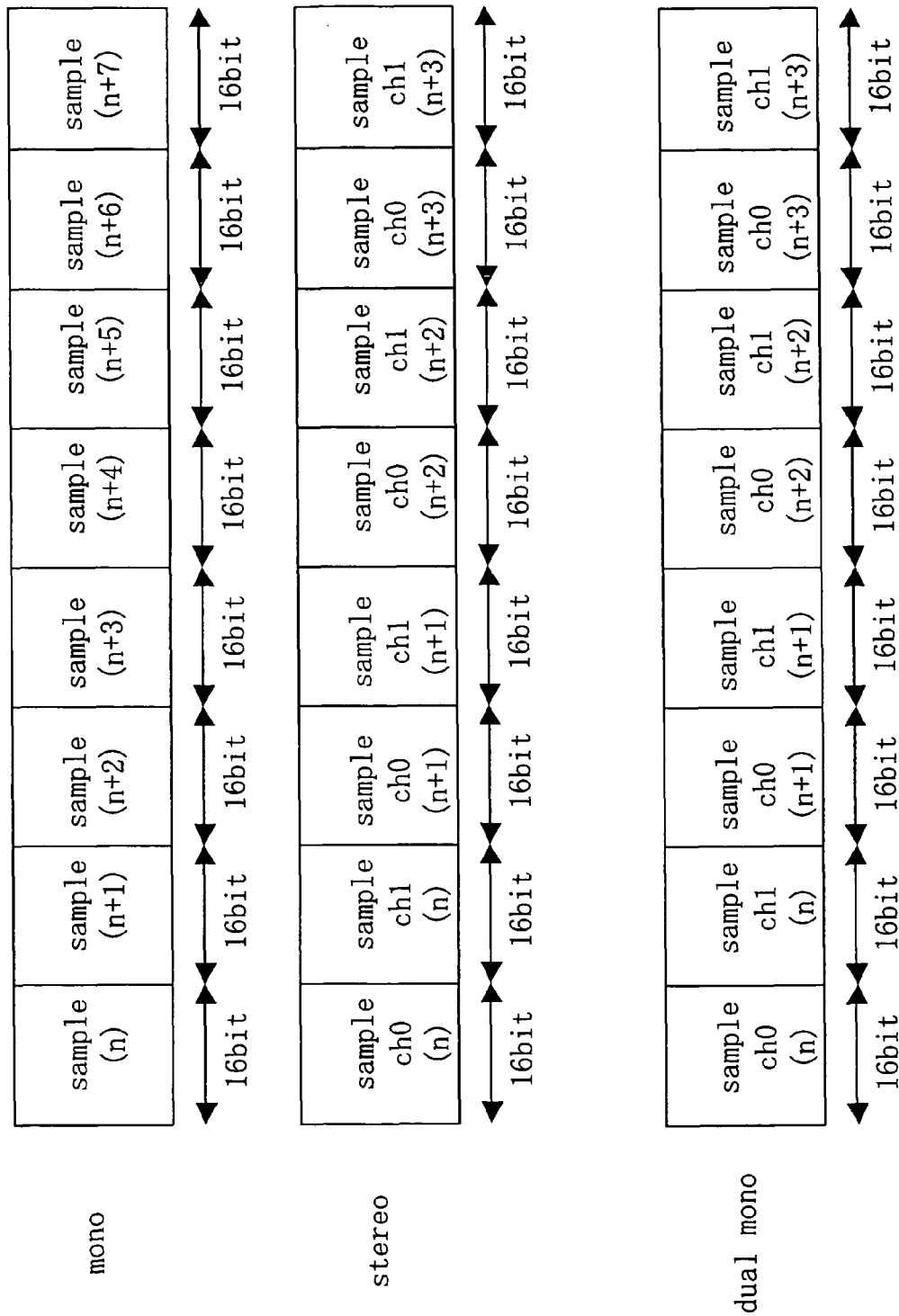
FIG. 9 illustrates structures of audio data (in the case of LPCM).

FIG. 9 illustrates structures of audio data (in the case of the LPCM format). In FIG. 9, each data is data of 16 bits per one sample. The audio data may not be composed of 16 bits per one sample in the DVD-video standard, but should be composed of 16 bits per one sample in the DVD-VR standard.

When data indicating the number of channels is mono, audio data includes data of one channel. In this case, data of 16 bits is used for every sample. If data indicating the number of channels is stereo, audio from the same audio source is recorded using two channels (i.e., ch0 and ch1). When data indicating the number of channels are dual mono, audio from two types of audio sources are recorded respectively using two channels (i.e., ch0, ch1). In this case, bilingual voice, for example, is allowed to be recorded.

Now, differences in VOB structure between the DVD-VR standard and the DVD-video standard will be described. Aspects that are permitted in the DVD-VR standard but are not permitted in the DVD-video standard are as follows:

(a) changes in resolution and aspect ratio of pictures
(b) a change in audio attribute
(c) dual mono audio data
(d) VOBUs having playback times of 0.4 sec. or less In addition, both of the standards have the following differences:

(e) An SCR in the leading pack of a VOB does not need to be zero in the DVD-VR standard but should be zero in the DVD-video standard.

(f) A PES_extension_field included in a pack header is added to the leading pack of each type of packs in each VOBU in the case of the DVD-VR standard, but is allowed to be added only to the leading pack of each type of packs in a VOB in the case of the DVD-video standard.

Now, the stream converter illustrated in FIG. 1 will be described. A bit stream recorded according to the DVD-VR standard is stored in the storage device 2. The stored bit stream is a bit stream exhibiting no changes in video resolution, aspect ratio and audio attribute and having a playback time of 0.4 seconds or more for each VOBU except for the end VOBU. The storage device 2 outputs a bit stream DVR to the stream analyzer 12 and the time-stamp rewriting unit 22.

The stream analyzer 12 reads and analyzes the bit stream DVR from the storage device 2 to obtain stream analysis information SI. The stream analysis information SI is output to the time-stamp rewriting unit 22, the NV_PCK generator 24, the PEF rewriting unit 26, the channel buffer 32, the channel copying unit 34 and the flag rewriting unit 36.

The stream analysis information SI is information necessary for converting a bit stream conforming to the DVD-VR standard into a bit stream conforming to the DVD-video standard, and includes information on an SCR, structures of a VOB and VOBUs, an A_SYNCA, a VOBU_2NDREF_EA, a VOBU_3RDREF_EA, an M_AVFIT (Movie AV File Information Table) and an ORG_PGCI (Original PGC Information), for example.

The time-stamp rewriting unit 22 acquires an SCR of the leading pack in a VOB from the stream analysis information SI based on the received information on the structures of the VOB and the VOBUs and on the SCR. The time-stamp rewriting unit 22 reduces the time indicated by the SCR in the leading pack in the VOB from time information on each of SCRs in Pack headers, PTSs (presentation time stamps) and DTSs (decoding time stamps) in Packet headers in packs forming the bit stream read out from the storage device 2. Then, the time-stamp rewriting unit 22 replaces the reduction results with the original SCRs, PTSs and DTSs, and outputs the resultant packs.

The NV_PCK generator 24 generates NV_PCKs from information on the A_SYNCA, the VOBU_2NDREF_EA, the VOBU_3RDREF_EA, the M_AVFIT, for example, obtained from the stream analysis information SI, overwrites RDI_PCKs in data output from the time-stamp rewriting unit 14 with the generated NV_PCKs (see FIG. 4), and outputs the obtained bit stream to the PEF rewriting unit 26.

The PEF rewriting unit 26 receives the bit stream generated by the NV_PCK generator 24 and the stream analysis information SI, detects the leading pack in each type of packs in a VOB from the stream analysis information SI, removes PES_extension_fields of the packs except for the leading packs in the VOB from the bit stream, and outputs the obtained bit stream as a conversion stream SC to the channel buffer 32 and the channel copying unit 34.

Figure 10:
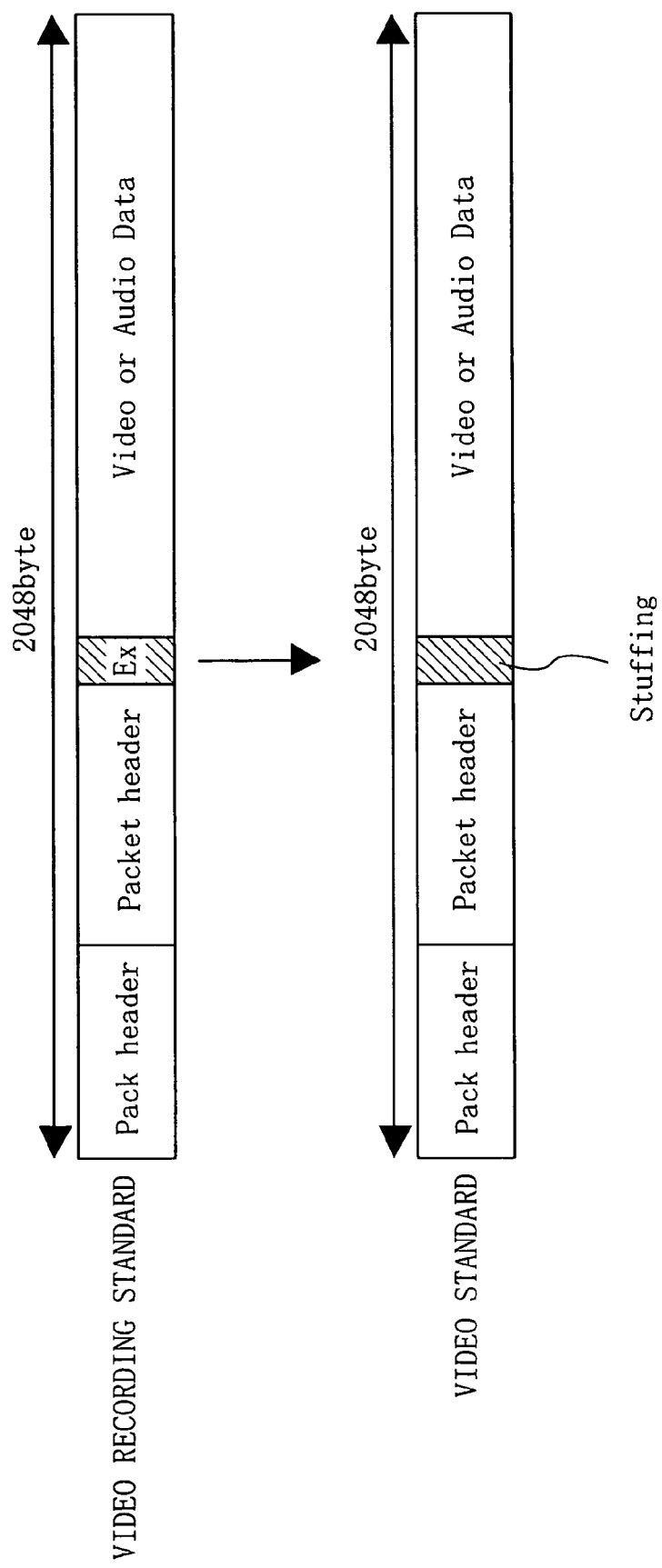
FIG. 10 illustrates removal of a PES_extension_field using stuffing bytes.

FIG. 10 illustrates removal of a PES_extension_field using stuffing bytes. In a packet including a PES_extension_field (indicated by Ex in FIG. 10), if no padding packet is provided and stuffing bytes are less than five bytes, the bits of the PES_extension_field_flag are rewritten to zero and then the portion corresponding to the PES_extension_field is overwritten with the stuffing bytes.

Figure 11:
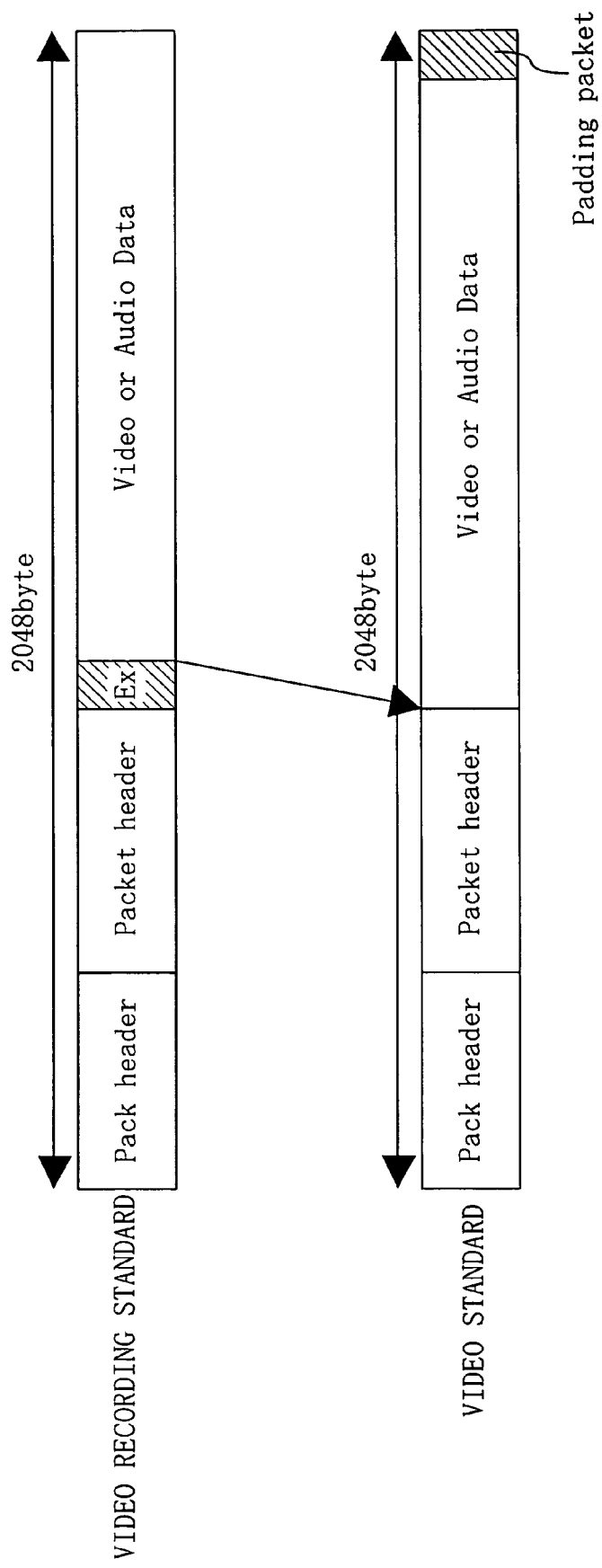
FIG. 11 illustrates removal of a PES_extension_field using a padding packet.

FIG. 11 illustrates removal of a PES_extension_field using a padding packet. In a packet including a PES_extension_field, if conditions that no padding packet is provided and stuffing bytes are less then 5 bytes are not satisfied, the bits of the PES_extension_field_flag are rewritten to zero and the PES_extension_field and the stuffing bytes are removed from the packet, and the removed data is compensated by a padding packet having the same length as the removed data.

Now, a conversion of audio data will be described. First, a case in which a bit stream conforming to the DVD-VR standard and including audio data (in the LPCM format) in the dual mono mode is recorded on the storage device 2 and this bit stream is supplied to the stream converter 100 will be described. In this case, the conversion stream SC output from the PEF rewriting unit 26 has a format conforming to the DVD-video standard, while including audio data in the dual mono mode. That is, audio data of the conversion stream SC does not conform to the DVD-video standard.

Figure 12:
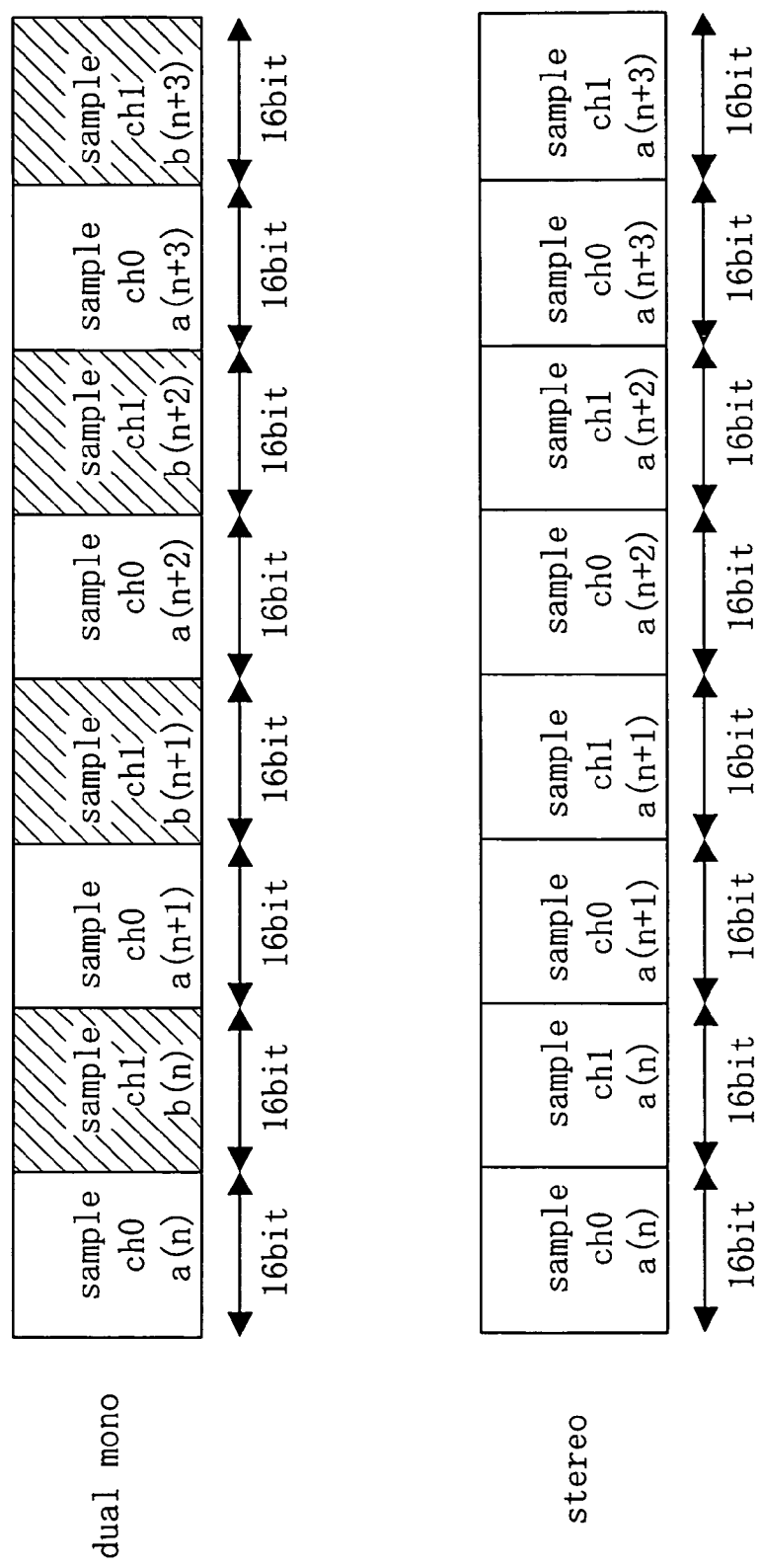
FIG. 12 illustrates structures of audio data before and after conversion by a channel buffer and a channel copying unit illustrated in FIG. 1.

FIG. 12 illustrates structures of audio data before and after conversion by the channel buffer 32 and the channel copying unit 34 illustrated in FIG. 1. The conversion stream SC is output from the PEF rewriting unit 26 in the dual mono mode shown in FIG. 12.

The channel buffer 32 stores sample data a(n), a(n+1), ... (where n is an integer) of ch0 in an audio pack and outputs the stored sample data to the channel copying unit 34. The channel copying unit 34 overwrites the sample data b(n), b(n+1), ... of ch1 in the audio pack with sample data a(n), a(n+1), ... output from the channel buffer 32, and generates data in the stereo mode. The channel copying unit 34 outputs a copy pack including the generated data in the stereo mode to the flag rewriting unit 36. The flag rewriting unit 36 receives the copy pack, rewrites a flag (number_of_audio_channels) indicating the number of channels in the audio data information from dual mono (1001b where b is added to indicate a binary number) into stereo (0001b), and outputs the obtained bit stream DV conforming to the DVD-video standard to the storage device 4.

On the other hand, in a case in which a pack other than an audio pack including data in the LPCM format is input to the stream converter 100, the channel buffer 32, the channel copying unit 34 and the flag rewriting unit 36 output the input packet without change according to the stream analysis information SI.

As described above, the stream converter 100 illustrated in FIG. 1 is capable of converting audio data in the dual mono mode not conforming to the DVD-video standard into data in the stereo mode conforming to the DVD-video standard and enables a digital conversion of a stream including audio data in the dual mono mode.

Embodiment 2

Figure 13:
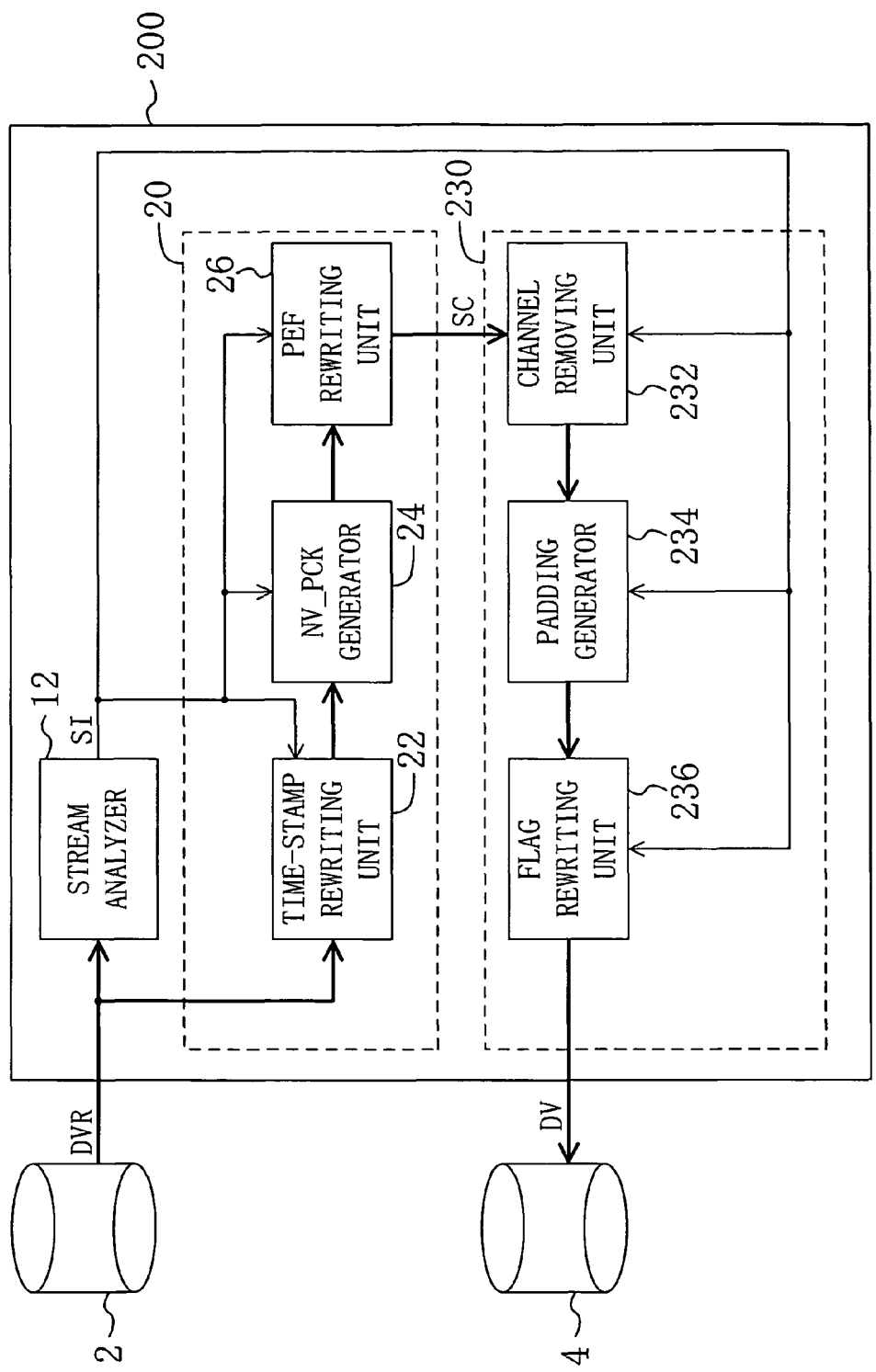
FIG. 13 is a block diagram illustrating a stream converter according to a second embodiment of the present invention.

FIG. 13 is a block diagram illustrating a stream converter according to a second embodiment of the present invention. The stream converter 200 illustrated in FIG. 13 is different from the stream converter 100 illustrated in FIG. 1 in that the second converter 30 is replaced with a second converter 230. The second converter 230 includes: a channel removing unit 232; a padding generator 234; and a flag rewriting unit 236. The other components are the same as those described with reference to FIG. 1 and are denoted by the same reference numerals. Thus, description thereof will be hereinafter omitted. A conversion stream SC is the same as that described in the first embodiment.

Figure 14:
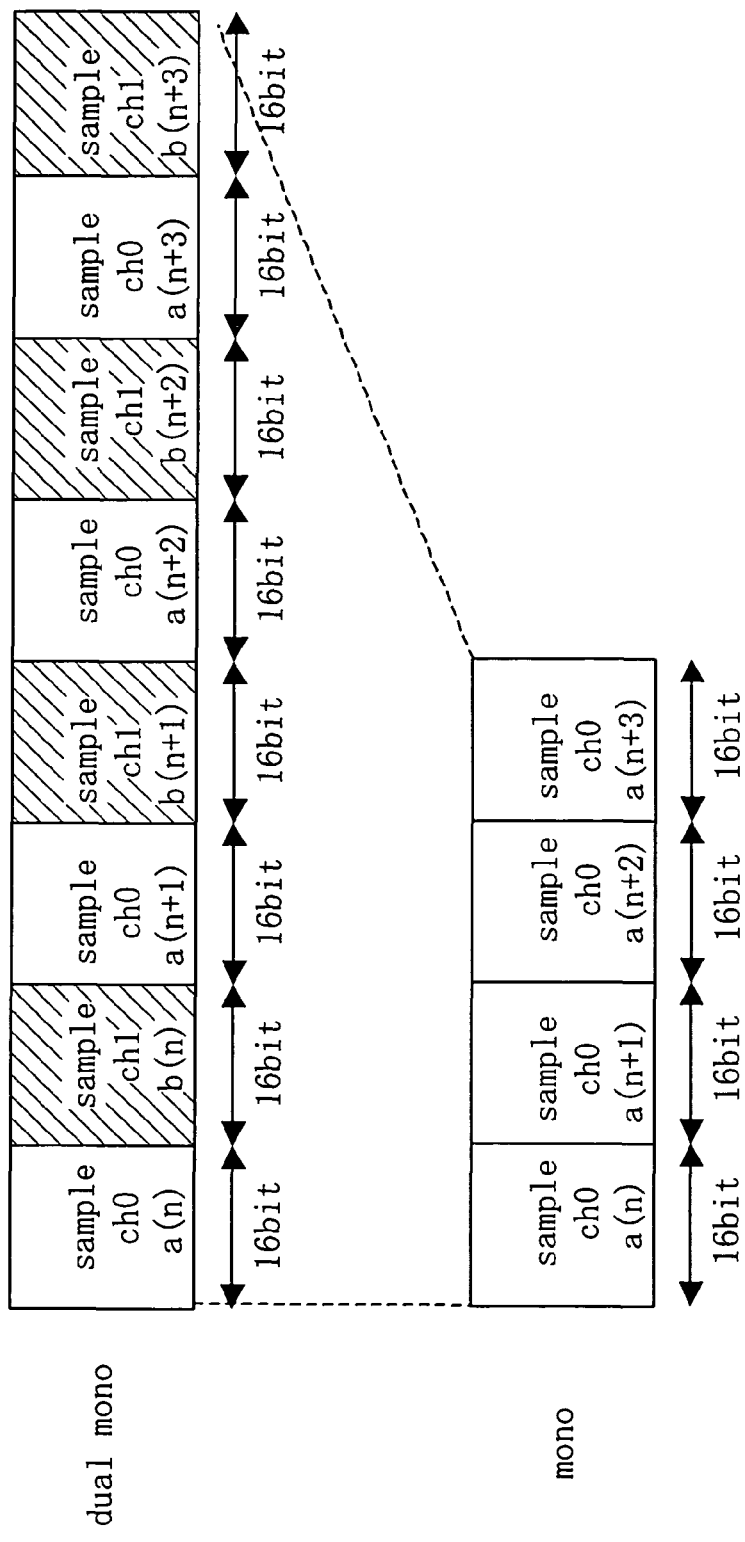
FIG. 14 illustrates structures of audio data in the input and the output, respectively, of a channel removing unit illustrated in FIG. 13.

FIG. 14 illustrates structures of audio data in the input and the output, respectively, of the channel removing unit 232 illustrated in FIG. 13. As in the first embodiment, it is assumed that a conversion stream SC output from a PEF rewriting unit 26 includes LPCM data in the dual mono mode illustrated in FIG. 14 as audio data.

The channel removing unit 232 receives the conversion stream SC output from the PEF rewriting unit 26, removes sample data b(n), b(n+1), . . . of ch1 in an audio pack therein, arranges sample data a(n) of ch0 closely without leaving the spaces of the removed data, and outputs the obtained stream to the padding generator 234 (see the mono mode in FIG. 14).

The padding generator 234 adds a padding packet having a length corresponding to the removed data for each received pack and outputs the resultant stream. If stuffing bytes are included in the Pack header of a pack output from the channel removing unit 232, the padding generator 234 removes the stuffing bytes and increases the length of the padding packet by a length corresponding to the length of the removed stuffing bytes.

The flag rewriting unit 236 receives a pack output from the padding generator 234 and rewrites a flag (number_of_audio_ channels) indicating the number of channels in audio data information from dual mono (1001b) to mono (0000b). In addition, the flag rewriting unit 236 reduces the value of a PES_header_length by the number of bytes of the removed audio data. Specifically, if stuffing bytes are included in the Pack header, the value of the PES_header_data_length is reduced by the number of reduced stuffing bytes and the resultant stream DV conforming to the DVD-video standard is output to a storage device 4.

In this manner, the stream converter 200 illustrated in FIG. 13 is capable of converting audio data in the dual mono mode not conforming to the DVD-video standard into data in the mono mode conforming to the DVD-video standard and enables a digital conversion of a stream including audio data in the dual mono mode.

Embodiment 3

Figure 15:
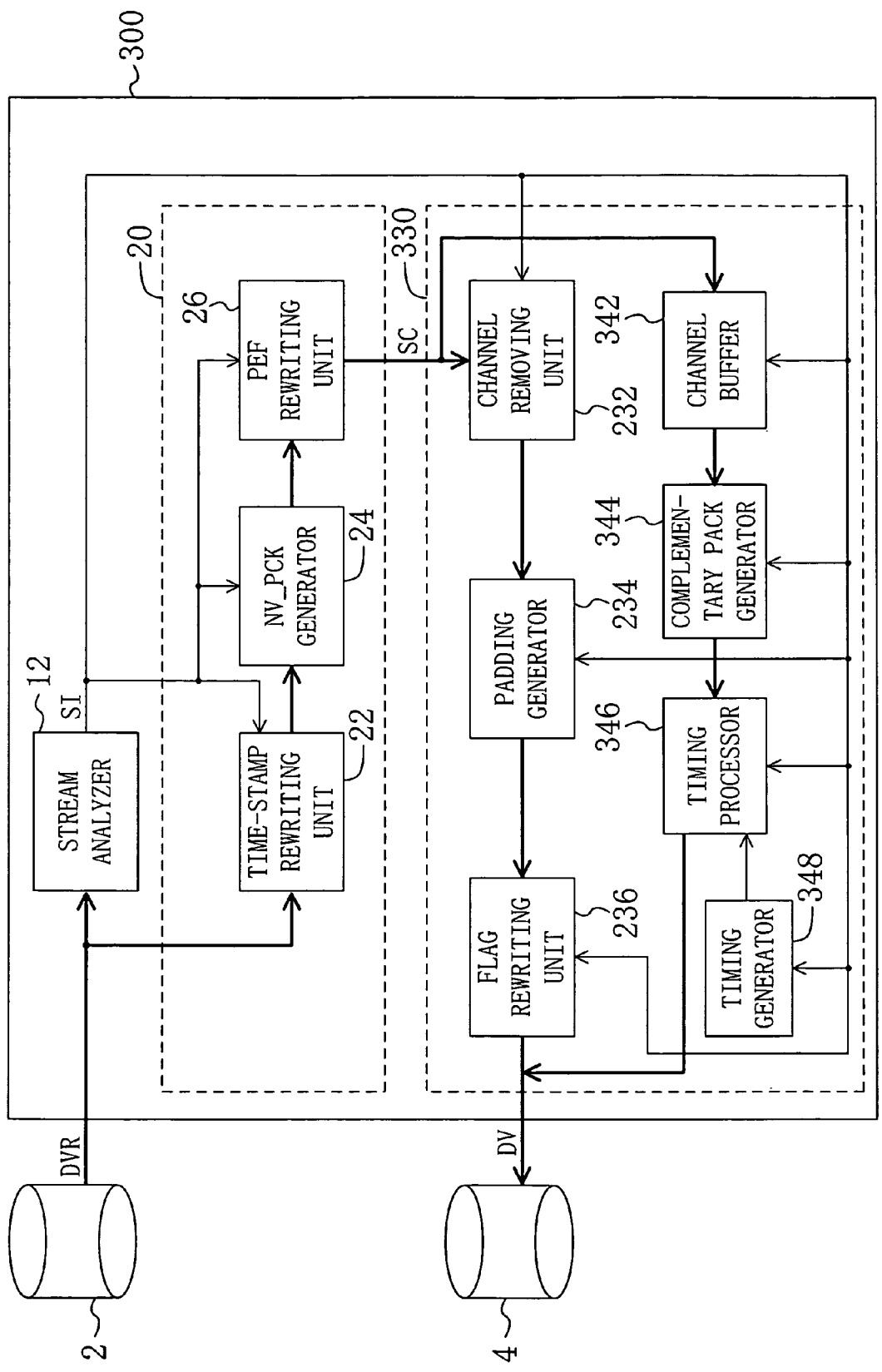
FIG. 15 is a block diagram illustrating a stream converter according to a third embodiment of the present invention.

FIG. 15 is a block diagram illustrating a stream converter according to a third embodiment of the present invention. The stream converter 300 illustrated in FIG. 15 is different from the stream converter 200 illustrated in FIG. 13 in that the second converter 230 is replaced with a second converter 330. The second converter 330 includes a channel buffer 342; a complementary pack generator 344; a timing processor 346; and a timing generator 348, in addition to the components of the second converter 230 illustrated in FIG. 13. The other components are the same as those described with reference to FIG. 13 and are denoted by the same reference numerals. Thus, description thereof will be hereinafter omitted. A conversion stream SC is the same as that described in the first embodiment.

The channel buffer 342 stores sample data b(n), b(n+1), . . . of ch1 in an audio pack which is to be removed by a channel removing unit 232 and outputs the sample data to the complementary pack generator 344.

The complementary pack generator 344 generates a packet including data output from the channel buffer 342 as audio data (in the LPCM format) and outputs a complementary pack including the generated packet to the timing processor 346. This complementary pack should have a sub_steam_id different from that in the original stream. At this time, neither SCR data nor PTS data is generated.

The timing generator 348 acquires an SCR(M) (where M is an arbitrary integer) which is an SCR of an audio pack to be converted and an SCR(M+1) which is an SCR of the next audio pack from a stream analysis information SI, and outputs (SCR(M)+SCR(M+1))/2—(time indicated by the leading SCR of a VOB) to the timing processor 346 as timing information.

The timing processor 346 receives the complementary pack, adds, to the received complementary pack, the timing information received from the timing generator 348, inserts the resultant complementary pack between the audio pack having the SCR(M) and the next pack having the SCR(M+1) output from the flag rewriting unit 236, and outputs the resultant stream.

In this manner, the stream converter 300 illustrated in FIG. 15 is capable of converting two types of audio data in the dual mono mode into the data of two channels in the mono mode without removal, thus enabling a digital conversion of a stream including audio data in the dual mono mode.

As in the case of FIG. 1, if one of two types of audio data is copied and used as data of another channel, a conversion into a stream including two types of data in the stereo mode is implemented.

Embodiment 4

Figure 16:
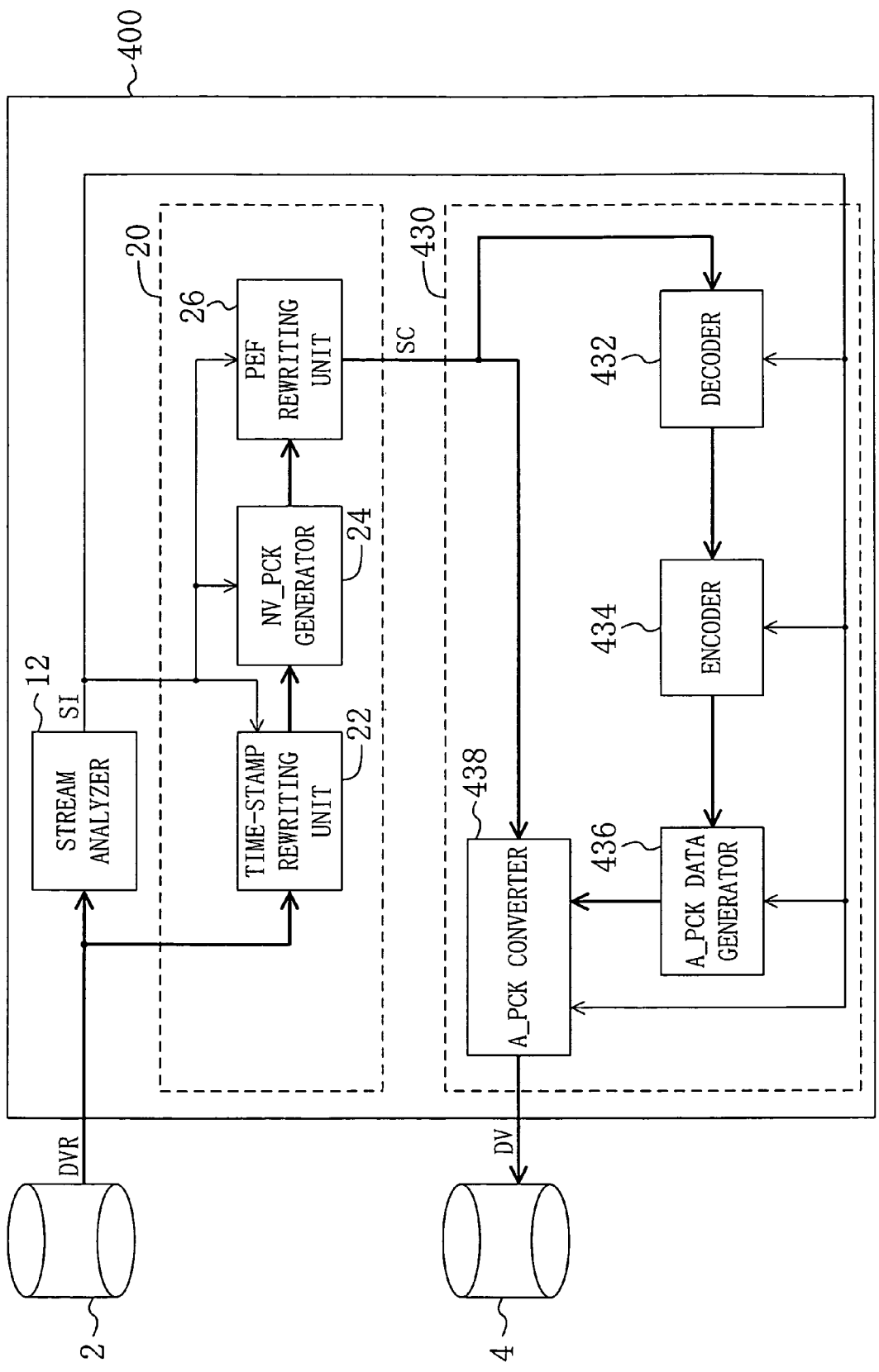
FIG. 16 is a block diagram illustrating a stream converter according to a fourth embodiment of the present invention.

FIG. 16 is a block diagram illustrating a stream converter according to a fourth embodiment of the present invention. A stream converter 400 illustrated in FIG. 16 is different from the stream converter 100 illustrated in FIG. 1 in that the second converter 30 is replaced with a second converter 430. The second converter 430 includes: a decoder 432; an encoder 434; an audio pack data generator (A_PCK data generator) 436; and an audio pack converter (A_PCK converter) 438. The other components are the same as those described with reference to FIG. 1 and are denoted by the same reference numerals. Thus, description thereof will be hereinafter omitted.

It is assumed that a bit stream DVR input to the stream converter 400 includes an audio pack including audio data compressed in the AC3 format. A conversion stream SC is supplied to the decoder 432 and the A_PCK converter 438. The conversion stream SC also includes a similar audio pack.

The decoder 432 decodes audio data in the dual mono mode compressed in the AC3 format, selects one of two channels, and outputs audio data of the selected channel to the encoder 434 as audio data in the mono mode.

The encoder 434 encodes the received audio data in the AC3 format again, compresses the encoded audio data, and outputs the obtained stream to the A_PCK data generator 436. The encoder 434 acquires a bit rate of audio data in an original audio pack from a stream analysis information SI and performs encoding such that audio data is allowed to be output at the bit rate. For example, the encoder 434 complements the encoded audio data by adding padding bytes to the audio data to make the audio data have the same length as that of audio data before decoding, and outputs the resultant stream.

The A_PCK data generator 436 generates data for an audio pack from the stream output from the encoder 434 and outputs the data to the A_PCK converter 438. The A_PCK converter 438 generates an audio pack based on the output of the A_PCK data generator 436 and, using the generated audio pack as a replacement of the audio pack of the conversion stream SC, outputs the obtained bit stream DV conforming to the DVD-video standard to the storage device 4.

In this manner, in the stream converter 400 illustrated in FIG. 16, if audio data is compressed in the AC3 format, only audio data is decoded, converted into audio data in a mode except for the dual mono mode, and then encoded. Accordingly, even in the case of compressed audio data, a digital conversion of a stream including audio data in the dual mono mode is enabled.

A bit stream DVR to be input to the stream converter 400 may include an audio pack including audio data compressed in a format not conforming to the DVD-video standard such as the MPEG audio format. In this case, it is sufficient that the decoder decodes such audio data and the encoder compresses the decoded audio data in the AC3 format, which is a format conforming to the DVD-video standard.

In the foregoing embodiments, the stream converter may include no stream analyzer. In this case, stream analysis information SI is previously stored in the storage device 2 and stream analysis information SI which has been read out is used in the stream converter.

Processes performed in the time-stamp rewriting unit 22, the NV_PCK generator 24 and the PEF rewriting unit 26 are independent of each other and may be performed in an order different from that described with reference to FIG. 1. Processing in the second processor may be performed before the processes in the time-stamp rewriting unit 22, the NV_PCK generator 24 and the PEF rewriting unit 26.

INDUSTRIAL APPLICABILITY

As described above, a stream converter according to the present invention is capable of outputting a bit stream including audio data conforming to the DVD-video standard without decoding. Accordingly, the stream converter is useful as, for example, apparatus for converting a bit stream conforming to the DVD-VR standard to a bit stream conforming to the DVD-video standard. For example, the stream converter is useful in a DVD recorder or other equipment.

The invention claimed is:

1. A stream converter, comprising:
    a first converter for receiving a bit stream conforming to a DVD-VR standard, converting data except for audio data in the bit stream into data conforming to a DVD-video standard, and outputting a resultant bit stream; and
    a second converter for converting, when the audio data does not conform to the DVD-video standard, the audio data in the bit stream output from the first converter into data conforming to the DVD-video standard without changing the number of audio packs, and outputting a resultant bit stream.

2. The stream converter of claim 1, wherein the second converter includes:
    a channel buffer for storing data of one channel in an input audio pack and outputting the data; and
    a channel copying unit for generating and outputting an audio pack in which data of another channel in the audio pack is replaced with the data output from the channel buffer.

3. The stream converter of claim 2, wherein the second converter further includes a flag rewriting unit for receiving an audio pack, supplying a flag indicating stereo as a flag indicating the number of channels in the audio pack, and outputting a resultant audio pack.

4. The stream converter of claim 1, wherein the second converter includes:
    a channel removing unit for removing data of one channel in an input audio pack and outputting a resultant audio pack; and
    a padding generator for adding, to the audio pack output from the channel removing unit, a padding packet having a length equal to the length of the removed data, and outputting a resultant audio pack.

5. The stream converter of claim 4, wherein the second converter further includes a flag rewriting unit for receiving an audio pack, supplying a flag indicating mono as a flag indicating the number of channels in the audio pack, and outputting a resultant audio pack.

6. The stream converter of claim 4, wherein when the audio pack output from the channel removing unit includes a stuffing byte, the padding generator removes the stuffing byte and increases the length of the padding packet by the length of the stuffing byte.

7. The stream converter of claim 4, wherein the second converter further includes:
    a channel buffer for storing data of a channel to be removed by the channel removing unit in an input audio pack and outputting the data; and
    a complementary pack generator for generating and outputting an audio pack including the data output from the channel buffer and a stream ID different from that in an audio pack input to the second converter.

8. The steam converter of claim 1, wherein when the audio data is compressed audio data, the second converter decodes the audio data, converts the decoded audio data into a format conforming to the DVD-video standard, encodes the converted audio data, and then outputs resultant data.

9. The stream converter of claim 1, wherein when the audio data is compressed in a format not conforming to the DVD-video standard, the second converter decodes the audio data, encodes the decoded audio data in a format conforming to the DVD-video standard, and outputs resultant data.

* * * * *